(12) United States Patent
Kolomeitsev et al.

(10) Patent No.: US 6,844,653 B2
(45) Date of Patent: Jan. 18, 2005

(54) STATOR DESIGN FOR PERMANENT MAGNET MOTOR WITH COMBINATION SLOT WEDGE AND TOOTH LOCATOR

(75) Inventors: Sergei F. Kolomeitsev, Rochester, MI (US); John R. Suriano, Auburn Hills, MI (US)

(73) Assignee: Valeo Electrical Systems, Inc., Auburn Hills, MI (US)

( * ) Notice: Subject to any disclaimer, the term of this patent is extended or adjusted under 35 U.S.C. 154(b) by 0 days.

(21) Appl. No.: 10/405,119

(22) Filed: Mar. 31, 2003

(65) Prior Publication Data

US 2004/0189136 A1 Sep. 30, 2004

(51) Int. Cl.[7] .............................. H02K 1/14; H02K 1/18; H02K 19/10
(52) U.S. Cl. ....................................... 310/218; 310/216
(58) Field of Search ................................. 310/194, 214, 310/215, 216, 218

(56) References Cited

U.S. PATENT DOCUMENTS

| | | | |
|---|---|---|---|
| 4,278,905 A | 7/1981 | Chari et al. ................ 310/52 |
| 4,330,726 A | 5/1982 | Albright et al. ............ 310/254 |
| 4,380,713 A | 4/1983 | Roger et al. ............... 310/214 |
| 4,427,910 A | 1/1984 | Richter et al. ............. 310/214 |
| 4,443,725 A | 4/1984 | Derderian et al. .......... 310/214 |
| 4,607,183 A | 8/1986 | Rieber et al. .............. 310/214 |
| 5,093,597 A | 3/1992 | Hughes ..................... 310/209 |
| 5,252,877 A | 10/1993 | Sawa et al. ................ 310/214 |
| 5,598,049 A | 1/1997 | Meier ....................... 310/214 |
| 5,654,603 A * | 8/1997 | Sung et al. ................ 310/214 |
| 5,770,910 A | 6/1998 | Horst ....................... 310/214 |
| 5,832,604 A | 11/1998 | Johnson et al. ........ 29/888.023 |
| 5,866,966 A | 2/1999 | Fulton ...................... 310/214 |
| 5,952,755 A | 9/1999 | Lubas ....................... 310/156 |
| 6,058,596 A | 5/2000 | Jansen et al. .............. 29/598 |
| 6,121,708 A | 9/2000 | Müller ...................... 310/214 |
| 6,124,659 A | 9/2000 | Rowe et al. ................ 310/214 |
| 6,175,176 B1 | 1/2001 | Vogler ...................... 310/154 |
| 6,188,158 B1 | 2/2001 | DeLuca et al. ............. 310/214 |
| 6,225,725 B1 | 5/2001 | Itoh et al. .................. 310/254 |
| 6,232,692 B1 | 5/2001 | Kliman ..................... 310/211 |
| 6,252,325 B1 | 6/2001 | Nashiki .................... 310/168 |
| 6,278,217 B1 | 8/2001 | Kliman et al. ............. 310/254 |
| 6,331,745 B2 | 12/2001 | Blakelock et al. .......... 310/214 |
| 6,335,582 B1 | 1/2002 | Abukawa et al. .......... 310/214 |
| 6,346,760 B1 | 2/2002 | Boardman, IV ........... 310/259 |
| 6,359,355 B1 | 3/2002 | Hartsfield et al. ........... 310/89 |
| 6,713,927 B2 * | 3/2004 | Kikuchi et al. ............ 310/214 |
| 2002/0079779 A1 * | 6/2002 | Muszynski ................ 310/218 |
| 2003/0214197 A1 * | 11/2003 | De Luca et al. ........... 310/218 |

FOREIGN PATENT DOCUMENTS

| | | | | |
|---|---|---|---|---|
| EP | 09084282 | * | 9/1995 | ........... 310/216 |
| EP | 10271718 | * | 10/1998 | ........... 310/216 |
| EP | 11275830 | * | 10/1999 | ........... 310/218 |
| EP | 11289727 | * | 10/1999 | ........... 310/216 |

(List continued on next page.)

Primary Examiner—Tran Nguyen
(74) Attorney, Agent, or Firm—J. Gordon Lewis (57) ABSTRACT

A segmented stator for a permanent magnet motor. The stator includes a plurality of stator segments forming an annular stator yoke and a plurality of stator teeth extending from an edge of the stator yoke. At least one coupling is between adjacent stator segments and shaped to allow movement of adjacent teeth in a so-called loose tooth design. Slot wedges are located between adjacent teeth to prevent the conductive windings from moving out of the slots through the slot openings. The slot wedges also prevent movement of adjacent teeth with respect to one another. The segmented stator can comprise an annular yoke with a plurality of discrete teeth or a plurality of assemblies including a rim section and a tooth section. The slot wedges can be keyed wedges that maintain their position through interlocking and/or can be integrated with a stator bobbin.

21 Claims, 5 Drawing Sheets

FOREIGN PATENT DOCUMENTS

| | | | | |
|---|---|---|---|---|
| EP | 11341717 | * 12/1999 | ................ | 310/218 |
| US | 2002/0011755 A1 | 1/2002 | ................ | 310/184 |
| US | 2002/0093269 A1 | 7/2002 | ................ | 310/254 |
| US | 2002/0134118 A1 | 9/2002 | ................ | 68/23 |
| US | 2002/0135255 A1 | 9/2002 | ................ | 310/166 |

* cited by examiner

STATOR DESIGN FOR PERMANENT MAGNET MOTOR WITH COMBINATION SLOT WEDGE AND TOOTH LOCATOR

BACKGROUND OF THE INVENTION

1. Field of the Invention

The invention relates in general to a stator for permanent magnet motors, and particularly to a stator design for a brushless permanent magnet motor that includes a combination slot wedge and tooth locator.

2. Description of the Related Art

Permanent magnet motors include a stator core, which is typically made of a stack of thin, metal laminations. The laminations are usually round, with a central opening. The stator core thus is generally cylindrical in shape, with a cavity extending longitudinally about the central axis of the core. In brushless permanent magnet motors, each stator lamination includes radially-extending openings from the central opening, generally called slots or notches, that are aligned when stacked to receive stator windings, or conductors, wound around the "teeth" formed by the radially-extending openings. The stator core surrounds a rotor, typically consisting of a circular steel shaft or a stack of annular laminations, and a number of permanent magnets are fixed around the circumference of the rotor.

In permanent magnet motors, cogging torque is caused by the combination of two factors, the permanent magnet magnetomotive force and the variation of the air gap permeance between the stator and the rotor. In the design of permanent magnet machines, cogging torque can be an important design consideration. Cogging torque adds unwanted harmonic components to the torque-angle curve, resulting in torque pulsation upon operation of the machine. Although net cogging torque is zero, levels of cogging torque at any given point in time cause noise, power losses and inaccuracies, particularly in servo-positioning drives. Thus, minimizing the momentary cogging torque is desirable. One approach to reducing the momentary cogging torque is to reduce the variation in air gap permeance by, for example, reducing the width of the stator slot openings. Small openings, among other problems, make the insertion of stator windings difficult.

Small openings are particularly a problem when considering power density goals in permanent magnet motors. Power density is determined by the rated power of the motor per unit volume. In most applications, the permanent magnet motor is required to have a high power density. This leads to a high volume of wire in a slot. To address this problem in part, slot wedges have been proposed that hold the stator windings in the slot against the radial force pushing them out of the slot, but such wedges fail to address tangential forces oftentimes experienced by the stator teeth.

SUMMARY OF THE INVENTION

The present invention is a stator for a permanent magnet motor that includes a slot wedge that performs the dual functions of aligning the teeth and constraining the high volume of stator windings to the slot. The first aspect of the invention is a segmented stator for a permanent magnet motor comprising a plurality of stator segments forming an annular stator yoke and a plurality of stator teeth extending from an edge of the stator yoke. At least one coupling is between adjacent stator segments and shaped to allow movement of each tooth of a pair of adjacent teeth associated with the adjacent stator segments. Each tooth of the pair is separated by a slot extending from a slot opening. Conductive windings are wrapped around each tooth in the pair of adjacent teeth and fill a portion of the slot. The stator also includes a plurality of slot wedges, one of the plurality of slot wedges engaged with each tooth in the pair of adjacent teeth to prevent the conductive windings from moving out of the slot through the slot opening. The plurality of wedges prevents movement of each tooth of the plurality of stator teeth with respect to remaining teeth of the plurality of stator teeth.

Another aspect of the present invention is an improvement to a segmented stator for a permanent magnet motor having a plurality of stator teeth extending a radial distance from a stator core, and wherein each tooth of the plurality of stator teeth is separated from an adjacent tooth by a slot opening and a slot extending from the slot opening. The improvement comprises at least one coupling joining a first segment of the stator to a second segment of the stator, wherein the first segment of the stator includes a first stator tooth and the second segment of the stator includes an adjacent second stator tooth. The at least one coupling is shaped to allow movement of the first stator tooth with respect to the second stator tooth when the first segment and the second segment are joined. The improvement also includes a wedge engaged with both the first stator tooth and the second stator tooth, wherein the wedge is located in a region of a slot opening between the first stator tooth and the second stator tooth and the wedge has a width at least as wide as the slot opening.

The segmented stator design according to the present invention allows the construction of a high power density permanent magnet motor while minimizing cogging torque resulting from tooth displacement. Other aspects of the present invention are contemplated and are described herein in more detail.

BRIEF DESCRIPTION OF THE DRAWING

The various features, advantages and other uses of the present invention will become more apparent by referring to the following detailed description and drawing in which.

DETAILED DESCRIPTION

Figure 1:
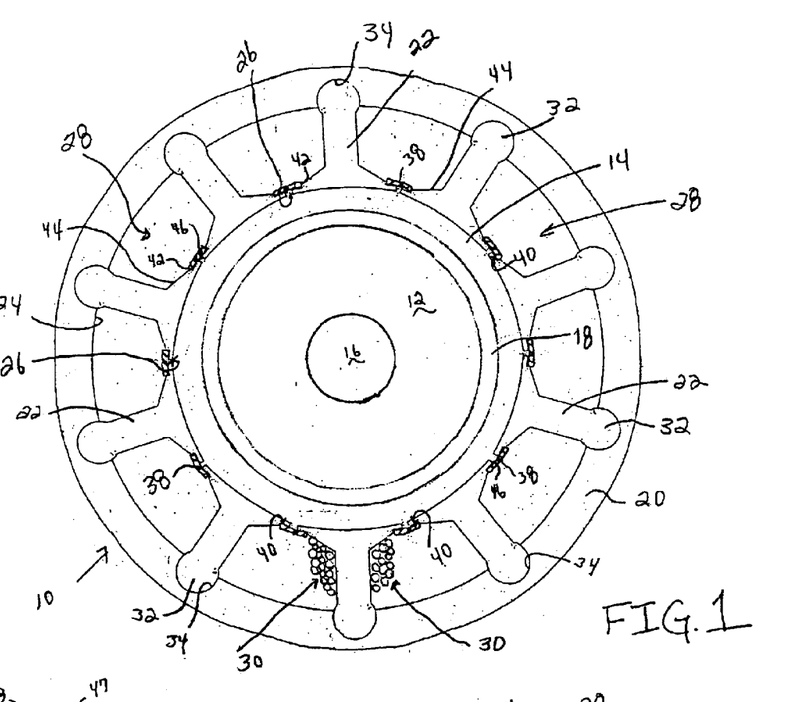
FIG. 1 is a plan view of a permanent magnet motor incorporating a stator design with a slot wedge according to one aspect of the present invention.

The drawing, particularly FIGS. 1–11, show the stator design for a permanent magnet motor according to the present invention. Although all of the drawing figures show the stator design incorporated into the common configuration where the rotor rotates on a shaft, and the stator surrounds the rotor, the invention can be used with a so-called "inside-out" design, that is, where the rotor rotates around the stator. FIG. 1 shows one design for a segmented stator 10 surrounding a rotor 12 and separated by an air gap 14. The rotor 12 is mounted on a rotatable shaft 16 and is constructed according to any number of known designs, such as a rotor comprising a rotor yoke with discrete permanent magnets or with a permanent magnet ring. In FIG. 1, a permanent magnet ring 18 forms a plurality of poles about the rotor 12.

Segmented stators are known whereby the stator comprises a plurality of stator segment assemblies separately wound with conductors before assembly in a motor. Such stator assembly segments typically comprise an outer rim section and a tooth section that extends radially inward the outer rim section. Adjacent outer rim sections are sometimes joined by the alignment of grooves and tongues or are press fit or hot dropped into a housing. These segmented stators and their assembly are described in U.S. Patent Publication Nos. US 2002/0011755 A1, US 2002/0093269 A1 and US 2002/0135255 A1, the entire contents of which are incorporated herein by reference. One characteristic of these segmented stators is that the stator assembly segments are fixedly joined to each other. This limits movement of the individual stator teeth during operation of the motor, but can create problems in fitting the stator segment assemblies together, especially when each stator tooth has a large number of windings.

In contrast, the segmented stator 10 of FIG. 1 is a "loose tooth" stator design. That is, each segment of the stator 10 is joined with an adjacent segment such that each stator tooth 22 is movable with respect to adjacent stator teeth 22. The segments of the loose tooth stator 10 of FIG. 1 include an annular stator yoke 20 with discrete teeth 22 located along an inner peripheral edge 24 of the stator yoke 20. Each tooth 22 is separated from the adjacent tooth by a slot opening 26 to a slot 28, and conductive windings 30 are wrapped around each of the stator teeth 22 to fill the slot 28 (only a portion of the conductive windings 30 around one tooth 22 shown for clarity). Coupling of each tooth 22 to the stator yoke 20 is accomplished by an extension 32 on each stator tooth 22 that is engaged within a recess 34 in the inner peripheral edge 24 of the stator yoke 20 in a predetermined sequence according to known methods after the stator teeth 22 are wound with the conductive windings 30. In FIG. 1, the extension 32 is bulbous-shaped so that the tooth 22 can rotatably move within the recess 34 of the stator yoke 20 in a pendulum-like movement. This pendulum-like movement is illustrated by the arrow 36 in FIG. 2 using a different tooth 22a with the same extension 32 mounted in the complementary recess 34 of the stator yoke 20.

The stator yoke 20 and each tooth 22, 22a are preferably made of a number of thin, metallic laminations, stacked to a predetermined axial length depending upon the application. Less preferably, the stator yoke 20 and each tooth 22 can also comprise solid, metallic pieces. As one of skill in the art recognizes, the size, shape and number of the teeth 22, slot openings 26 and slots 28 depend upon a variety of factors, including, for example, the number of poles of the permanent magnet ring 18 and the size and number of conductive windings 30. As can be ascertained by FIG. 2, absent some additional means of securing the position of the tooth 22 of FIG. 1, the tooth 22 is movable when mounted, limited only by the displacement of the conductive windings 30 and the adjacent teeth 22. Displacement of a tooth 22 resulting from tangential forces or misalignment during construction can cause problems in tooth-to-tooth alignment, resulting in higher momentary cogging torque.

Figures 1A, 2:
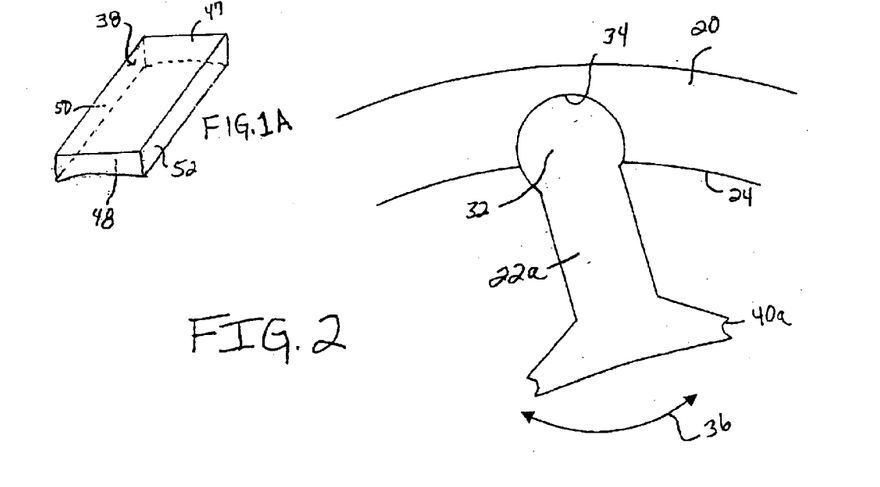
FIG 1A is a perspective view of the slot wedge according to FIG. 1.
FIG. 2 is a plan view of a first coupling of a stator tooth with a stator yoke according to the loose tooth stator design of FIG. 1.

Addressing this problem in the loose tooth stator 10 according FIG. 1 is a slot wedge 38 that simultaneously holds the conductive windings 30 in the slot 28 and locates the teeth 22 with respect to each other. Each stator tooth 22 has two wedge supports 40. Each wedge support 40 of FIG. 1 is a cutout extending from a point 42 along the portion of the edge 44 of the tooth 22 facing radially-outward toward the stator yoke 20 to a point 46 along the transverse edge of the tooth 22 closest to the adjacent tooth 22. The wedge support 40 is thus located at the so-called "crown" of the tooth 22 in the region of the slot opening 28. The wedge supports 40 shown are L-shaped supports that form two longitudinally-extending rabbets for the insertion of a roughly block-shaped slot wedge 38 having a length equal to the length of the stator 10 such as shown in FIG. 1A. The slot wedge 38 preferably comprises any number of nonmagnetic materials, such as plastics and their composites, fiberglass or epoxies. The slot wedge 38 can be press molded or otherwise formed according to known techniques.

The slot wedge 38 has a first surface 47 and an opposed surface 48, whose optional curved shaped is exaggerated slightly in FIG. 1A for illustrative purposes. Extending between the surfaces 47 and 48 are two roughly parallel surfaces 50 and 52. Each surface 47, 48, 50 and 52 extends longitudinally to the axial length of the stator yoke 20. When the slot wedge 38 is in position, the surface 48 is in contact with the "top" surface of each wedge support 40, that is, the portion of each wedge support 40 facing radially-outward toward the stator yoke 20. Similarly, the surfaces 50, 52 are in contact with at least a portion of the "side" surface of each wedge support 40, that is, the portion of each wedge support tangential to the rotational axis of the shaft 16. Thus, when the slot wedge 38 is in position, movement of adjacent teeth 22 toward one another is prevented. When all of the slot wedges 38 are in place, movement of adjacent teeth 22 away from one another is also prevented. Since the slot wedge 38 extends across the slot opening 26, the slot wedge 38 also prevents the conductive windings 30 from slipping out the slot 28 during operation of the motor.

In FIG. 1, the slot wedge 38 maintains its contact with wedge support 40 by outward forces supplied by the conductive windings 30. Specifically, the thickness of the slot wedge 38 from the surface 48 to the surface 47 varies based upon the volume of the slot 28 that the conductive windings 30 occupy when the stator teeth 22 are assembled to the stator yoke 20. In FIG. 1, by example, the thickness of the slot wedge 38 is such that it extends slightly beyond point 42 along the portion of the edge 44 of each tooth 22 where the wedge support 40 begins.

Figures 3, 4:
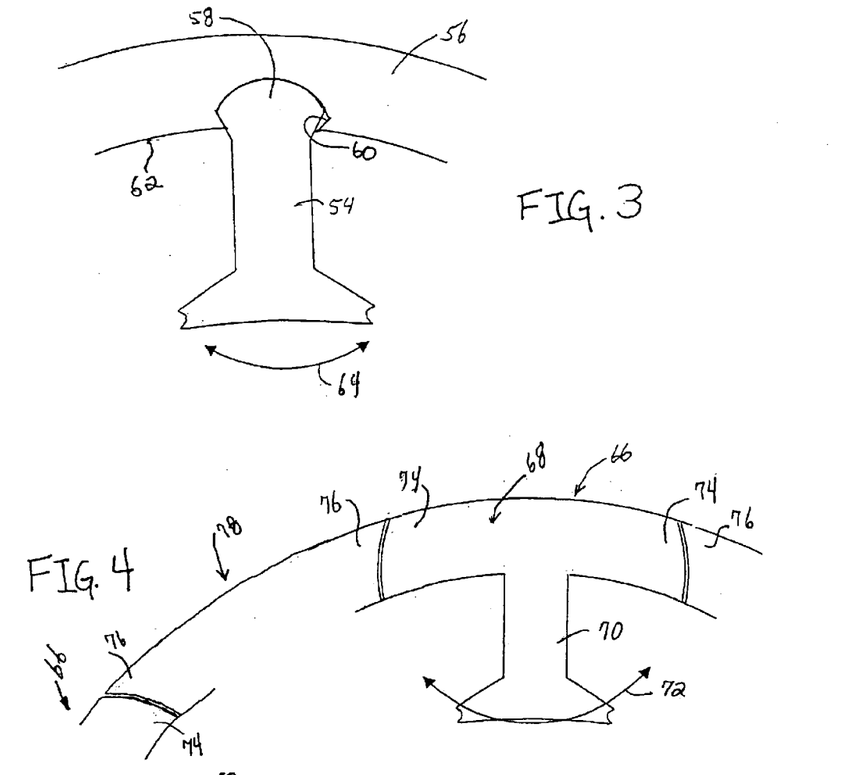
FIG. 3 is a plan view of an alternative coupling of a stator tooth to a stator yoke according to the loose tooth stator design of FIG. 1.
FIG. 4 is a plan view of a first coupling of a stator tooth according to a second aspect of a loose tooth stator design.

Of course, as discussed in more detail hereinafter, the shape of the wedge supports 40 as L-shaped and the slot wedge 38 as roughly block-shaped are by example only. FIG. 2, for example, shows a tooth 22a with a wedge support 40a for a keyed wedge, as discussed in more detail herein. Similarly, the loose tooth stator 10 where each tooth 22 has a bulbous-shaped extension 32 engaged with a complementary-shaped recess 34 in an annular stator yoke 20 is only one example of a loose tooth stator 10 of the present invention. FIG. 3 shows one tooth 54 of an alternative loose tooth stator design where discrete teeth are mounted in an annular yoke 56. The tooth 52, like the tooth 22, has an extension 58 engageable with a complementary-shaped recess 60 in the inner peripheral edge 62 of the stator yoke 56. Instead of a bulbous shape, however, the extension 58 is crescent-shaped between two flat edges extending radially-outward from the main body, i.e., the winding area of the tooth 54. The recess 60 is a crescent-shaped cutout in the stator yoke 56 into which the extension 58 is inserted. The recess 60 is sized so that the crescent of the extension 58 is in contact with the crescent of the recess 60 as the tooth 54 moves in the directions shown by the arrow 64. The two flat edges of the recess 60 extend along a wider path that those of the extension 58 so that the two flat edges of the recess 60 act as stops to the two flat edges of the extension 58, limiting the range of rotation of the tooth 54 within the stator yoke 56.

FIGS. 1, 2 and 3 show loose tooth stator designs where the segmented stator includes a plurality of discrete teeth engaged in recesses around the peripheral edge of a stator yoke. Other couplings according to this stator design based upon the teachings herein are contemplated. The only requirement for the shape of the coupling is that it should allow the movement of teeth with respect to one another. A loose tooth stator design can also be implemented with stator segment assemblies comprising an outer rim section and a tooth section that extends radially inward the outer rim section. When completely constructed, the outer rim sections of the stator segment assemblies form the stator yoke. FIGS. 4–7 show variations in these loose tooth stator designs.

FIG. 4 shows one stator segment 66 comprising an outer rim section 68 and an integral tooth section 70. The outer rim section 68 has two extensions 74 that join with extensions 76 from adjacent stator segments (only a portion of one adjacent stator segment 78 is shown). The extensions 74 are arcs that join with complementary-shaped arcs in the extensions 76 so that the tooth 70 can rotate like a pendulum as shown by the arrow 72. This stator segment 66 is most often used in a loose tooth stator with an even number of teeth, where this stator segment 66 alternates with stator segments 78. The alternative stator segments 78 also allow movement of the integral tooth, in this case, radially outward from the rotor (not shown in FIG. 4) and radially inward toward the rotor.

Figure 5:
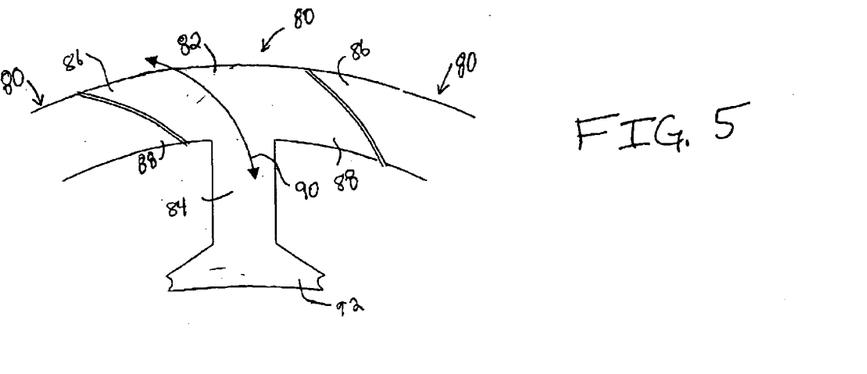
FIG. 5 is a plan view of a second coupling of a stator tooth according to the loose tooth stator design of FIG. 4.

FIG. 5 includes another design of a stator segment 80 comprising an outer rim section 82 and an integral tooth section 84. Like FIG. 4, the outer rim section 82 has two extensions 86 and 88 that respectively join with extensions 88 and 86 from adjacent stator segments 80. The extensions 86, 88 are arcs that allow the stator segment 80 to rotate in the directions shown by the arrow 90. Upon such rotation, the tooth section 84 also rotates such that the crown 92 of the tooth section 84 moves closer to and away from the rotor in a "rocking" motion.

Figure 6A:
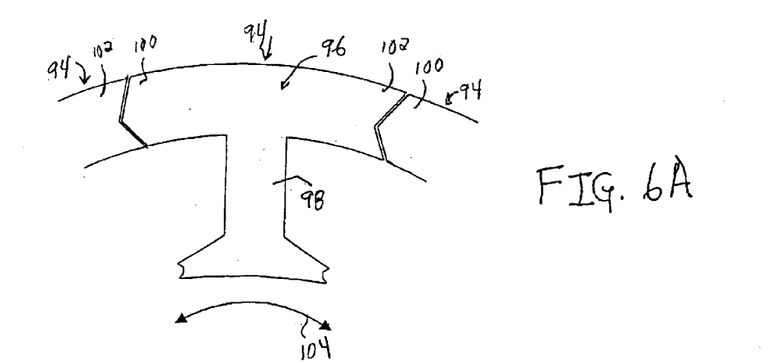
FIG. 6A is a plan view of a third coupling of a stator tooth according to the loose tooth stator design of FIG. 4.
Figure 6B:
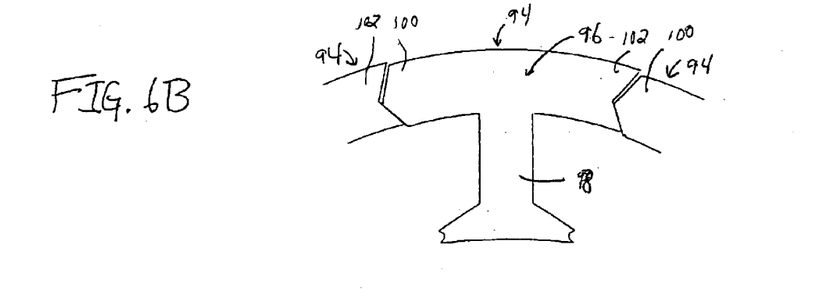
FIG. 6B is a plan view of the third coupling according to FIG. 6A displaced from its optimal mounted position.

FIGS. 6A and 6B illustrate yet another design of a stator segment 94 comprising an outer rim section 96 and an integral tooth section 98. Each outer rim section 96 has extensions 100 and 102. The extension 100 is in the shape of a chevron extending toward and engaging with the complementary-shaped extension 102 in an adjacent stator segment 94. Depending upon the tolerances of the adjoining extensions 100 and 102, the stator segment 94 can rotate with respect to the adjacent stator segments 94. For example, the stator segment 94 can rotate along the arc of the outer rim section 96 in the directions indicated by the arrow 104 in FIG. 6A. The stator segment 94 can also move in other directions with respect to the adjacent stator segments 94. The stator segment 94 is shown in one displaced position in FIG. 6B.

Figure 7:
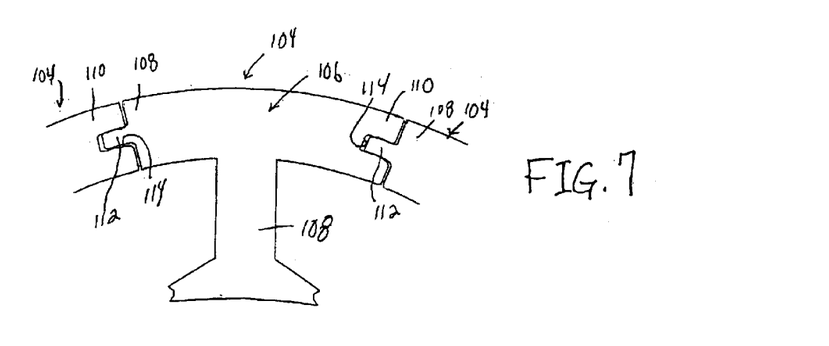
FIG. 7 is a plan view of a fourth coupling of a stator tooth according to the loose tooth stator design of FIG. 4.

The stator segment 104 of FIG. 7 also has an outer rim section 106 and an integral tooth section 108. Each outer rim section 106 has extensions 108 and 110. The extension 108 ends in a tongue 112 that fits into a corresponding groove 114 in the extension 110 of an adjacent stator segment 104. The stator segment 104 can rotate along the arc of the outer rim section 106 as described with respect to FIG. 6A, moving the tooth section 108 closer to and farther away from adjacent tooth sections 108.

It should be noted that loose tooth stator designs as described with respect to FIGS. 1–3 and loose tooth stator designs as described with respect to FIGS. 4–7 are not mutually exclusive. Thus, although less desirable, a loose tooth stator design incorporating couplings between outer rim sections can be combined with discrete teeth couplings to individual outer rim sections. Any of the loose tooth stator designs described with respect to FIGS. 2–7 can be used in a stator for a permanent magnet motor with a variety of slot wedges other than that described in FIG. 1. The only requirement for a slot wedge, such as slot wedge 38 of FIG. 1, is that it be sized to maintain the desired spacing between adjacent teeth and to prevent the conductive wires from falling out of the slot through the slot opening. Other slot wedge designs are shown in FIGS. 8–11.

Figure 8:
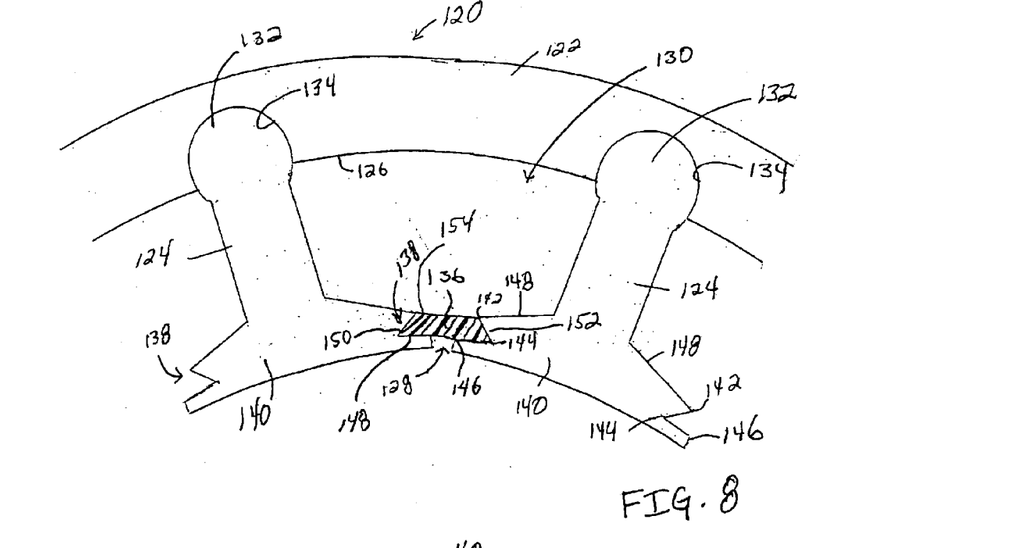
FIG. 8 is a partial plan view of a permanent magnet motor incorporating a stator design with a keyed wedge according to a second aspect of the present invention.

The partial stator 120 shown in FIG. 8 is similar to the stator 10 of FIG. 1 in that it includes an annular stator yoke 122 with discrete teeth 124 located along an inner peripheral edge 126 of the stator yoke 122. Each tooth 124 is separated from the adjacent tooth 124 by a slot opening 128 to a slot 130. Conductive windings (not shown) are wrapped around each of the stator teeth 124 to fill the slot 130. Also like FIG. 1, the extension 132 on each stator tooth 124 is bulbous-shape and engaged within a corresponding recess 134 in the inner peripheral edge 126 of the stator yoke 122.

The slot wedge of FIG. 8 is keyed wedge 136 that, like the slot wedge 38 of FIG. 1, simultaneously holds the conductive windings in the slot 130 and locates the teeth 124 with respect to one another. Each stator tooth 124 has two wedge supports 138. Each wedge support 138 is a cutout in the crown 140 of the stator tooth 124 extending from a first point 142 along the edge 148 of the crown 140 facing toward the stator yoke 22 to a second point 144 radially closer to the rotor (not shown) and further away from the adjacent tooth 124 than the first point 142. The cutout then extends to a third point 146 along the transverse edge of the crown 140 closest to the adjacent tooth 124. The wedge support 138 extends longitudinally to a length equal to the length of the stator 120.

The keyed wedge 136 is roughly trapezoidal-shaped with a length equal to the length of the wedge support 138 and the stator 120. Each keyed wedge 136 extends from the wedge support 138 of one tooth 124 to the wedge support 138 of an adjacent tooth 124 such that the first surface 148 and opposed second and third surfaces 150, 152 of the keyed wedge 136 abut the surfaces of the wedge supports 138. When the keyed wedge 136 is in position, movement of adjacent teeth 124 toward one another is prevented. When all of the keyed wedges 136 are in place, movement of adjacent teeth 124 away from one another is also prevented, and the conductive windings are prevented from slipping out the slots 130 during operation of the motor.

Like the slot wedges 38 of FIG. 1, the keyed wedges 136 preferably comprise any number of nonmagnetic materials as previously discussed. Unlike the roughly block-shaped slot wedge 38 of FIG. 1, however, the keyed wedges 136, like the others discussed in FIGS. 9–11, do not maintain contact with the wedge support of the tooth by outward pressure from the conductive windings. Instead, the shapes of the keyed wedge 136 and its associated wedge supports 138 prevent the movement of the keyed wedge 136 into the slot 130. Thus, unlike the surface 47 of the slot wedge 38, the surface 154 of the keyed wedge 136 facing the stator yoke 122 is flush with the outside edge 148 of the tooth 124, although this is not necessary as shown by FIG. 10.

Figure 9:
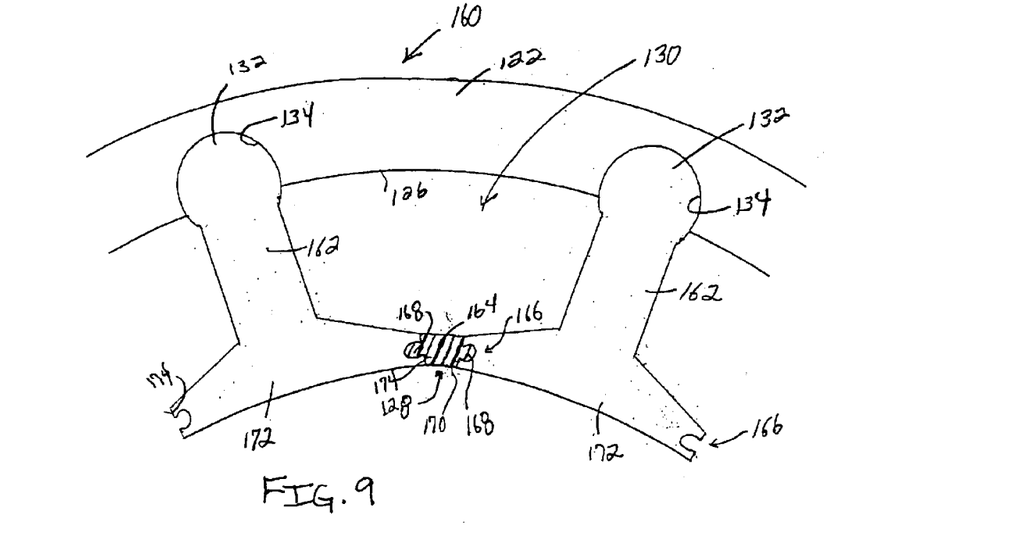
FIG. 9 is a partial plan view of a permanent magnet motor incorporating a stator design with an alternative keyed wedge according to a second aspect of the present invention.

FIG. 9 illustrates a partial stator 160 similar to that shown in FIG. 8. In FIG. 9, two discrete teeth 162 are located along the inner peripheral edge 126 of the stator yoke 122 as described with respect to FIG. 8. The slot wedge of FIG. 9 is also a keyed wedge 164 engaged with a wedge support 166 of each stator tooth 162. The keyed wedge 164 is roughly block-shaped with two extensions 168. Each extension 168 extends from a transverse edge 170 facing a transverse edge 174 of the crown 172 of the adjacent stator tooth 162. As used herein, a transverse edge is an edge extending roughly at a right angle to the rotational axis of the body. Each extension 168 resembles a nub of a puzzle piece and fits into the complementary-shaped wedge support 166 extending into the crown 172 from the transverse edge 174 of the crown 172. Once again, the keyed wedge 164 has a length equal to the length of the wedge supports 166 and the stator 160. The keyed wedges 164 are nonmagnetic and manufactured according to known techniques. When the keyed wedges 164 are in position, they form an interlocking relationship, preventing movement of adjacent teeth 162 both toward and away from one another. The conductive windings (not shown in FIG. 9) are also prevented from slipping out the slots 130 during operation of the motor.

Figure 10:
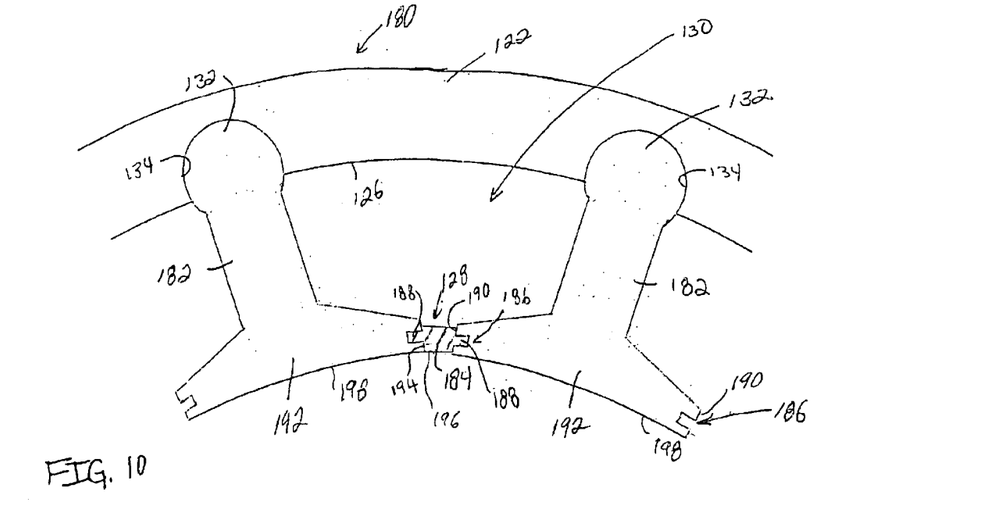
FIG. 10 is a partial plan view of a permanent magnet motor incorporating a stator design with an alternative keyed wedge according to a third aspect of the present invention.

Another partial stator 180 is shown in FIG. 10. Two discrete teeth 182 are once again located along the inner peripheral edge 126 of the stator yoke 122 as described with respect to FIG. 8. The slot wedge is also a keyed wedge 184 that is engaged with a wedge support 186 of each stator tooth 182. The keyed wedge 184 is roughly block-shaped with two extensions 188 extending from a transverse edge 190 facing a transverse edge 194 of the crown 192 of the adjacent stator tooth 182. Instead of a puzzle piece configuration as shown in FIG. 10, each extension 188 is a tongue that fits into a complementary-shaped groove of the wedge support 186 extending into the crown 192 from the transverse edge 194 of the crown 192. Once again, the keyed wedge 184 has a length equal to the length of the wedge supports 186 and the stator 180. When the keyed wedge 184 is in position, movement of adjacent teeth 182 toward one another is prevented. When all of the keyed wedges 184 are in place, movement of adjacent teeth 182 away from one another is also prevented. The conductive windings are also prevented from slipping out the slots 130 during operation of the motor.

Previous wedges comprised nonmagnetic, preferably insulating, materials such as plastics and their composites, fiberglass or epoxies. In FIG. 10, however, the keyed wedge 184 has ferromagnetic properties, which is optional in any of the wedge designs. This can be accomplished by adding a powder containing ferromagnetic material to the base material of the keyed wedge 184 during the early stages of the manufacturing process. Because the goal of a wedge with ferromagnetic properties, such as the keyed wedge 184, is to reduce the effective slot opening 128, the surface 196 of the keyed wedge 184 facing the rotor (not shown) is flush with the surface 198 of the crown 192 facing the rotor.

Figure 11:
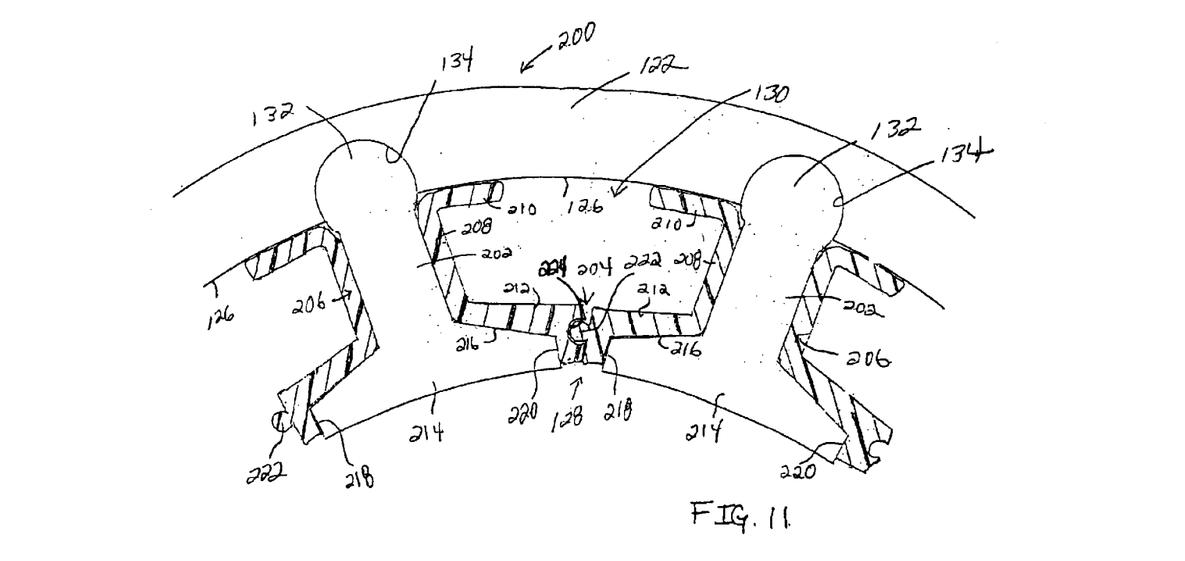
FIG. 11 is a partial plan view of a permanent magnet motor incorporating a stator design with stator bobbins having an integral keyed wedge according to a fourth aspect of the present invention.

Another unique design for a stator 200 according to the present invention is partially shown in FIG. 11. Once again, two discrete teeth 202 are located along the inner peripheral edge 126 of the stator yoke 122. The slot wedge is a keyed wedge 204 integral with a tooth bobbin 206. Bobbins generally comprising plastic that aid the placement and retention of the conductive windings on stator teeth are known in the art. Here, the tooth bobbin 206 for each tooth 202 is similar to the known bobbins. The tooth bobbin 206 has a central hollow portion 208 with a first annular flange 210 extending radially from one end of the hollow portion 208 and a second annular flange 212 extending radially from the second end of the hollow portion 208. The central hollow portion 208 has an inner circumference sufficient to surround the tooth 202. The length of the tooth bobbin 206 is such that the first annular flange 210 extends along a portion of the inner peripheral edge 126 of the stator yoke 122, and the second annular flange 212 extends along the "top" edge of the crown 214 of the tooth 202, that is, the edge 216 facing the stator yoke 122 when the bobbin 206 is mounted on the tooth 202.

The keyed wedge 204 is integral with the second annular flange 212 so that the keyed wedge 204 of the second annular flange 212 is in contact with the transverse edges 218 and 220 of the tooth 202 closest to the transverse edges 220 and 218, respectively, of the adjacent teeth 202. Along the longitudinal length of the tooth 202 at the transverse edge 218 of the crown 214 is an extension 222, which fits into a recess 224 along the longitudinal length of the tooth 202 at the transverse edge 220 of the crown 214. Like the extensions 168 of FIG. 9, each extension 222 resembles a nub of a puzzle piece and fits into the complementary-shaped recess 224. Together, the extension 222 and the recess 224 form the keyed wedge 204. Thus, when the teeth 202, surrounded by the bobbins 206 and wound with the conductive windings, are engaged with the stator yoke 122, the keyed wedges 204 prevent movement of adjacent teeth 202 both toward and away from one another and prevent the conductive windings from slipping out the slots 130 during operation of the motor.

Many variations in the stator designs according to the present invention are contemplated beyond those described herein. The stator is a unique design incorporating "loose tooth" construction with slot wedges that minimize the effects of both radial and tangential forces on the stator teeth and their associated windings.

What is claimed is:

1. A segmented stator for a permanent magnet motor, the stator comprising:

a plurality of stator segments forming an annular stator yoke and a plurality of stator teeth extending from an edge of the stator yoke;

at least one coupling between adjacent stator segments, the at least one coupling shape to allow movement of each tooth with respect to adjacent teeth, wherein each tooth in a pair of adjacent teeth is separated by a slot extending from a slot opening;

conductive windings wrapped around each tooth of the pair of adjacent teeth and filling a portion of the slot; and a plurality of slot wedges, one wedge of the plurality of slot wedges engaged with each tooth of the pair of adjacent teeth to prevent the conductive windings from moving out of the slot through the slot opening and wherein the plurality of wedges prevent movement of each tooth of the plurality of stator teeth with respect to remaining teeth of the plurality of stator teeth.

2. The segmented stator according to claim 1, further comprising:

a first bobbin supporting the conductive windings on a first tooth of the pair of adjacent teeth; and a second bobbin supporting the conductive windings on a second tooth of the pair of adjacent teeth; and wherein the one wedge comprises a two-part connector, a first part of the connector being an integral extension from a transverse edge of the first bobbin in the region of the slot opening and a second part of the connector being a recess in a transverse edge of the second bobbin in the region of the slot opening.

3. A segmented stator for a permanent magnet motor, the stator comprising:

a plurality of stator segments forming an annular stator yoke and a plurality of stator teeth extending from an edge of the stator yoke;

at least one coupling between adjacent stator segments, the at least one coupling shaped to allow movement of each tooth in a pair of adjacent teeth associated with the adjacent stator segments, wherein each tooth in the pair is separated by a slot extending from a slot opening;

conductive windings wrapped around each tooth of the pair of adjacent teeth and filling a portion of the slot;

a plurality of slot wedges, one wedge of the plurality of slot wedges engaged with each tooth of the pair of adjacent teeth to prevent the conductive windings from moving out of the slot through the slot opening; and wherein the plurality of wedges prevents movement of each tooth of the plurality of stator teeth with respect to remaining teeth of the plurality of stator teeth;

a first bobbin supporting the conductive windings on a first tooth of the pair of adjacent teeth; and a second bobbin supporting the conductive windings on a second tooth of the pair of adjacent teeth and wherein the one wedge comprises a two-part connector, a first part of the connector being an integral extension from a transverse edge of the first bobbin in the region of the slot opening and a second part of the connector being a recess in a transverse edge of the second bobbin in the region of the slot opening; and wherein the extension and the recess form an interlocked connection.

4. The segmented stator according to claim 1 wherein each of the plurality of wedges has ferromagnetic properties.

5. The segmented stator according to claim 1, further comprising:

a first crown of a first tooth of the pair of adjacent teeth being in a region of the slot opening;

a second crown of a second tooth of the pair of adjacent teeth being in the region of the slot opening; and wherein the one wedge is engaged with the first crown and the second crown.

6. The segmented stator according to claim 5, further comprising:

a first wedge support integral with the first crown;

a second wedge support integral with the second crown; and wherein the one wedge has a interlocking relationship with each of the first wedge support and the second wedge support.

7. The segmented stator according to claim 6, wherein the first wedge support includes a first recess and the second wedge support ies a second recess; and wherein the one wedge includes a first extension and a second extension, the first extension complementary-shaped to the first recess and fixedly engaged with the first recess and the second extension complementary-shape to the second recess and fixedly engaged with the second recess.

8. The segmented stator according to claim 1 wherein the stator yoke is a unitary body and wherein the at least one coupling includes a first coupling connecting a first stator tooth to a peripheral edge of the stator yoke and a second coupling connecting a second stator tooth to the peripheral edge of the stator yoke.

9. The segmented stator according to claim 8, further comprising:

a first crown of the first stator tooth being in a region of the slot opening;

a second crown of the second stator tooth being in the region of the slot opening; and wherein the one wedge is engaged with the first crown and the second crown.

10. The segmented stator according to claim 1 wherein each of the plurality of stator segments comprises a first stator rim section and a first stator tooth extending radially away from the first stator rim section and wherein the second segment comprises a second stator rim section and a second stator tooth extending radially away from the second stator rim section; and wherein the at least one coupling is a single coupling connecting the first outer stator rim section to the second outer stator rim section.

11. In a segmented stator for a permanent magnet motor, the stator having a plurality of stator teeth extending a radial distance from a stator core, each tooth of the plurality of stator teeth separated from an adjacent tooth by a slot opening and a slot extending from the slot opening, the improvement comprising:

at least one coupling joining a first segment of the stator to adjacent second segments of the stator, wherein the first segment of the stator includes a first stator tooth and each second segment of the stator includes an adjacent second stator tooth, and wherein the at least one coupling is shaped to allow movement of the first stator tooth with respect to each second stator tooth when the first segment and the second segments are joined; and a wedge engaged with both the first stator tooth and one adjacent second stator tooth, wherein the wedge is located in a region of a slot opening between the first stator tooth and the one second stator tooth and the wedge has a width at least as wide as the slot opening.

12. The improvement according to claim 11, further comprising:

conductive windings wrapped around each of the first stator tooth and the one second stator tooth, the conductive windings filing at least a portion of a slot between the first stator tooth and the one second stator tooth.

13. The improvement according to claim 12 further comprising:
a first bobbin supporting the conductive windings on the first stator tooth; and
a second bobbin supporting the conductive windings on the ine second stator tooth; and wherein the wedge comprises a two-part connector, a first part of the wedge being an integral extension from a transverse edge of the first bobbin in the region of the slot opening and a second part of the wedge being a recess in a transverse edge of the second bobbin in the region of the slot opening.

14. The improvement according to claim 13 wherein the extension and the recess form an interlocked connection.

15. The improvement according to claim 11 wherein the wedge has ferromagnetic properties.

16. The improvement according to claim 11, further comprising:
a first crown of the first stator tooth in the region of the slot opening;
a second crown of the one second stator tooth in the region of the slot opening; and wherein the wedge is engaged with the first crown and the second crown.

17. The improvement according to claim 16, further comprising:
a first wedge support integral with the first crown;
a second wedge support integral with the second crown; and wherein the wedge has a interlocking relationship with each of the first wedge support and the second wedge support.

18. The improvement according to claim 17, wherein the first wedge support includes a first recess and the second wedge support includes a second recess; and wherein the wedge includes a first extension and a second extension, the first extension complementary-shaped to the first recess and fixedly engaged with the first recess and the second extension complementary-shaped to the second recess and fixedly engaged with the second recess.

19. The improvement of claim 11, further comprising:
a stator yoke; and wherein the at least one coupling includes a first coupling comb the first stator tooth to a peripheral edge of the stator yoke and a second coupling connecting the one second stator tooth to the peripheral edge of the stator yoke.

20. The improvement of claim 11, wherein the first segment comprises a first stator rim section and the first stator tooth extension radially away from the first stator rim section and wherein the second segment comprises a second stator rim section and the one second stator tooth extending radially away from the second stator rim second; and wherein the at least one coupling is a single coupling connecting the first outer stator rim section to the second outer stator rim section.

21. The improvement of claim 11, further comprising:
a second wedge engaged with both the first stator tooth and the other adjacent second stator tooth, wherein the wedge is located in a region of a slot opening between the first stator tooth and the other second stator tooth and the wedge has a width at least as wide as the slot opening.

* * * * *